Oct. 9, 1956 J. H. BEESLEY 2,766,326

ELECTRICAL SIGNALLING SYSTEM

Filed Oct. 14, 1953 2 Sheets-Sheet 1

INVENTOR
JOHN HENRY BEESLEY
BY [signature]
ATTORNEY

Oct. 9, 1956 J. H. BEESLEY 2,766,326

ELECTRICAL SIGNALLING SYSTEM

Filed Oct. 14, 1953 2 Sheets-Sheet 2

INVENTOR
JOHN HENRY BEESLEY

BY [signature]
ATTORNEY 2,766,326

ELECTRICAL SIGNALLING SYSTEM

John Henry Beesley, Coventry, England, assignor to The General Electric Company Limited, London, England Application October 14, 1953, Serial No. 386,004

Claims priority, application Great Britain October 14, 1952

6 Claims. (Cl. 179—18)

The present invention relates to automatic telephone systems and is more particularly concerned with equipment in an automatic telephone exchange that is individual to each subscriber. Such equipment is hereinafter referred to in this specification as a "subscriber's line equipment."

In an automatic telephone exchange of the so-called electronic type which utilises non-mechanical switching, it has been proposed to terminate a subscriber's line wires with a hybrid coil, this coil having windings that are connected to input and output speech circuit and to a balancing network. The input and output speech circuits are connected to frequency or pulse modulators and demodulators respectively. For the purpose of making a call through the exchange between two subscribers, paths are set up between the modulators and demodulators associated with the two subscribers.

These modulators and demodulators and the paths between them are generally only capable of transmitting a limited amount of power, and accordingly it is usually necessary to provide some amplification of a speech signal supplied by a demodulator before feeding that signal to the line wires. In order to operate a subscriber's bell or other calling device when the subscriber is wanted, it is, however, usually necessary to supply a calling or ringing current to the line wires of considerably greater voltage and power. The power of the ringing current supplied to the line wires may be of the order of one watt compared with a level of speech signal when a call is established of the order of one milliwatt. It is therefore necessary for a subscriber's line equipment to be able to supply ringing current to the subscriber's line wires at a higher level than the speech signal supplied by that equipment and one object of the present invention is to provide a form of subscriber's line equipment that enables this to be done.

According to the present invention, in a subscriber's line equipment which is for an automatic telephone exchange and which is adapted to be connected to a pair of line wires, there is an amplifier through which is arrenged to pass signals to the line wires and means to vary the gain of the amplifier in dependence upon the current flowing through the line wires.

Preferably the amplifier is a magnetic amplifier.

Reference is now made to a paper entitled "Electronic Telephone Exchanges," by T. H. Flowers in The Proceedings of the Institution of Electrical Engineers, volume 99, part 1, No. 119, at pages 181 to 192. The problem mentioned above of supplying sufficient power for calling purposes is discussed in the second paragraph on page 186 of this paper, and in Figure 7 there is shown the circuit of a suitable subscriber's line equipment.

Figure 1:
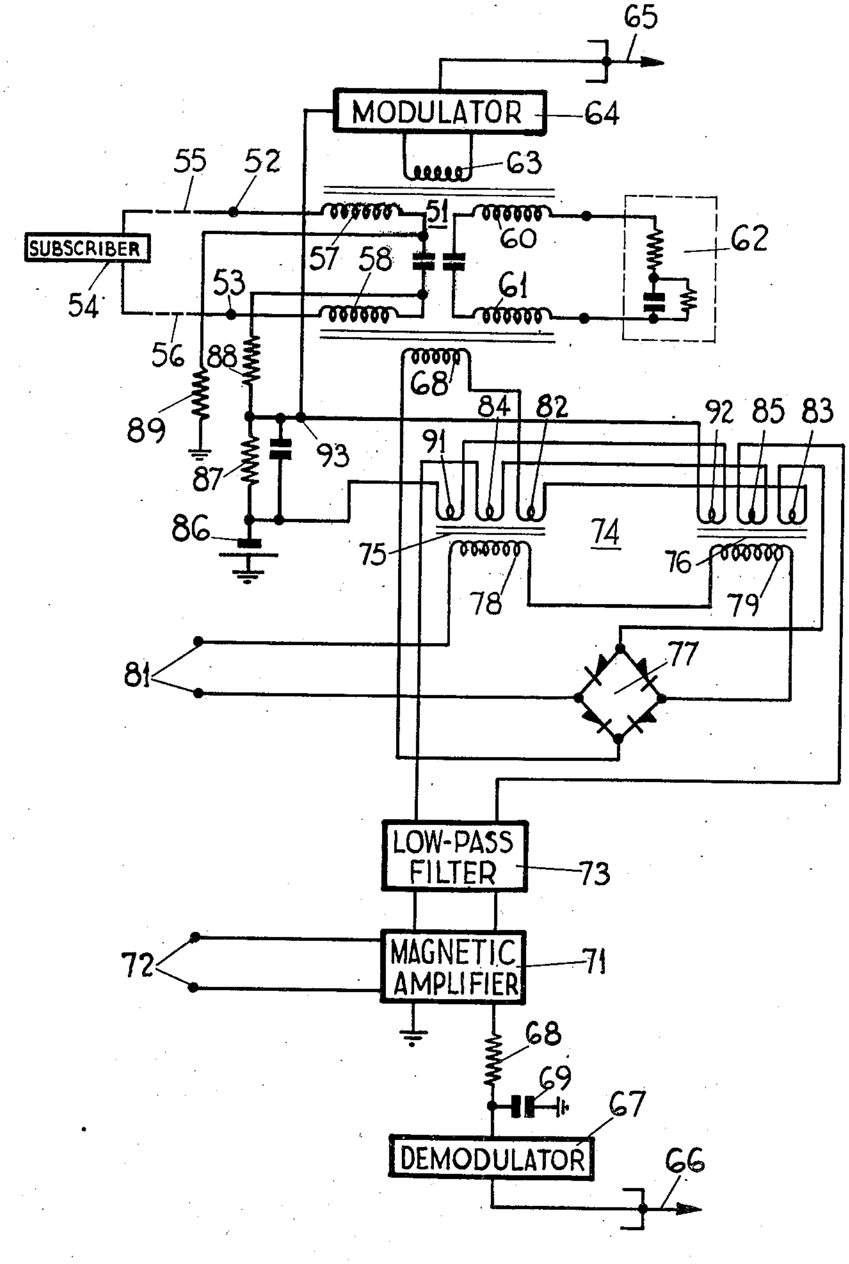
Figure 2:
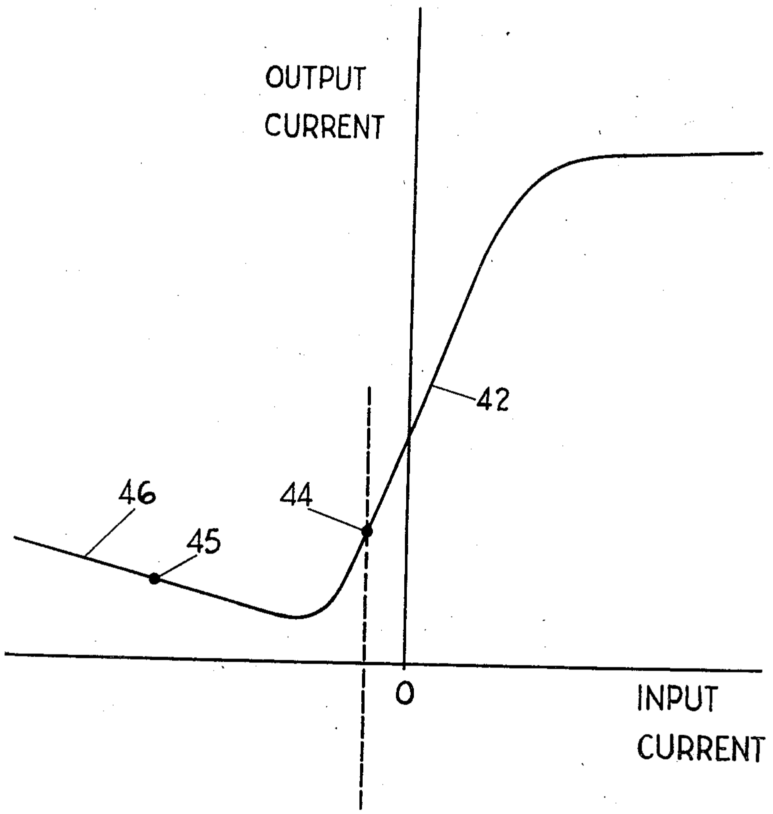

One example of a subscriber's line equipment in accordance with the present invention will now be described with reference to the two figures of the accompanying drawings in which Figure 1 shows the circuit diagram of the equipment and Figure 2 shows the operating characteristic of the magnetic amplifier in the equipment.

Since this embodiment of subscriber's line equipment has the same external connections as that shown in Figure 7 of the said paper, no detailed description is included in the present specification of the rest of the electronic exchange through which paths may be provided between different subscribers' line equipment for the purpose of setting up a call, although in Figure 1 blocks are shown representing the items of equipment directly associated with the subscriber's line equipment although not forming part of that equipment.

Referring now to Figure 1, the subscriber's line equipment comprises a hybrid coil 51 having a pair of terminals 52 and 53 that are connected to a subscriber 54 over a pair of line wires 55 and 56. The windings 57 and 58 thus carry the subscriber's line current and speech current while the windings 60 and 61 are connected in series with a balancing network 62. A winding 63 is connected to a modulator 64 which is adapted to supply a train of modulated pulses. The modulator 64 of each subscriber's line equipment in the exchange supplies a train of modulated pulses having a phasing characteristic of the subscriber to which the line equipment is connected and the outputs of a plurality of these modulators are combined. The signal supplied over the line or highway 65 may contain a train of pulses modulated by speech from the subscriber 54.

The signal supplied over a line or highway 66 to the demodulators 67 of a plurality of subscribers' line equipments also consists of a plurality of modulated pulse trains that are combined in time division multiplex. The demodulator 67 of the subscriber's line equipment under consideration is adapted to demodulate one of these trains of pulses and the modulation is supplied after amplification to a winding 68 of the hybrid coil 51 and thus over the line wires 55 and 56 to the subscriber 54. In fact the output from the demodulator 67 is passed through a filter circuit which comprises a resistor 68 and a condenser 69 to a fixed gain magnetic amplifier 71.

This magnetic amplifier 71 is of known construction and is adapted to be energized with alternating current having a frequency of the order of 100 kilocycles per second that is supplied to the terminals 72. This amplifier 71 may in fact be in the form of two component magnetic amplifiers that are of identical construction and have their control windings connected in series and their outputs connected back-to-back so that there is no output signal when the control windings are carrying no current.

The output signal supplied by the magnetic amplifier 71 is passed through a low-pass filter 73 to another magnetic amplifier 74. The amplifier 74 comprises a transductor having two cores 75 and 76 in combination with a full wave rectifier 77. The alternating current windings 78 and 79 of the cores 75 and 76 are connected in series with one another and with the bridge rectifier 77 across a pair of terminals 81 to which is supplied alternating current having a frequency of 100 kilocycles per second. Control windings 84 and 85 are connected in series and carry the output signal from the filter 73 while the winding 68 is connected in series with windings 82 and 83 across the output of the bridge rectifier 77. This serves to provide positive feed-back across the magnetic amplifier 74 with the result that the amplifier has the characteristic shown in Figure 2. This figure shows the relationship between the input current in the control windings 84 and 85 and the output current in the winding 68.

The automatic exchange is arranged so that the train of pulses supplied over the highway 66 to which the demodulator 67 is responsive is modulated either with speech from a remote subscriber talking to the subscriber 54 or with a convenient ringing or calling signal for the purpose of calling the subscriber 54. This ringing signal has the same frequency and substantially the same waveform as the ringing current supplied over the line wires 55 and 56 and may, for example, have a relatively low frequency such as 50 cycles per second in which case its waveform is preferably peaked or sawtooth. Alternatively, if the subscriber 54 is arranged to be called by broadcasting from a loudspeaker, the calling signal may have a sinusoidal waveform at a frequency of several hundred cycles per second.

Thus at different times either speech or the calling signal is supplied by the demodulator 67 and the level of the speech signal is of the same order as the calling signal. As previously discussed, it is, however, required that the level of these two signals shall be substantially different when fed out over the line wires 55 and 56 to the subscriber 54, and for this purpose the gain of the magnetic amplifier 74 is arranged to be varied.

Referring now also to Figure 2, the magnetic amplifier 74 as so far described is normally biassed to the point 44 on the characteristic. This bias is provided either by direct current supplied by the magnetic amplifier 71 in the absence of any output from the demodulator 67 or by current carried by additional bias windings on the cores 75 and 76. This is the condition under which the magnetic amplifier 74 operates when the subscriber 54 is to be called by the exchange with the result that the amplifier 74 operates over the straight portion 42 of its characteristic, and it will be noticed that under this condition the amplifier 74 has maximum gain. As soon as the subscriber 54 replies by lifting his handset from its cradle, the cradle switch closing causes a loop to be completed across the line wires 55 and 56 in known manner. A direct current path is thus established between the battery 86, one side of which is earthed, through resistors 87 and 88, the hybrid coil winding 58 and the line wire 56 to the subscriber 54 while the return path is over the line wire 55, the hybrid coil winding 57 and a resistor 89 to earth. The direct current flowing from the battery 86 to the subscriber 54 energises the subscriber's microphone and the voltage developed across the resistor 87 causes current to flow through bias windings 91 and 92 on the cores 75 and 76 with the result that the magnetic amplifier 74 is biassed to the point 45 on its characteristic. The voltage developed at the point 93 is utilised to switch on the modulator 64 with the result that a train of unmodulated pulses are then supplied to the highway 65. This train of pulses indicates that the connection to the subscriber 54 has been completed whereupon the exchange replaces the calling modulation on the train of pulses supplied to the demodulator 67 with speech modulation from the remote subscriber initiating the call.

This circuit may be modified by omitting the resistor 87, and in that case the bias windings 91 and 92 carry the whole of the direct current supplied over the line wires 55 and 56.

Under this condition the magnetic amplifier 74 is biassed ) the point 45 so as to operate over the straight portion ;6 of its characteristic with the result that it has substantially less gain than previously. This ensures that the speech signals supplied over the line wires 55 and 56 to the subscriber 54 have the desired level.

In the event of the subscriber 54 initiating a call through the exchange, it will be realised that the flow of direct current from the battery 86 as soon as he lifts his handset from its cradle causes the magnetic amplifier 74 to operate at the point 45 on its characteristic. Thus any signal through the exchange to the subscriber 54, for example speech from a remote subscriber or busy tone, is supplied to the line wires 52 and 53 at the lower level.

Although the embodiment described above has included a fixed gain amplifier 71 between the demodulator 67 and the variable gain amplifier 74, it will be appreciated that this fixed gain amplifier is not essential to the present invention. It is, however, convenient for two stages of amplification to be provided since the response of two magnetic amplifiers is somewhat more rapid than if the same degree of gain were obtained in a single amplifier. Moreover, the variable gain amplifier 74, instead of being a magnetic amplifier may be an amplifier utilising electronic valves or transistors.

I claim:

1. In an automatic telephone exchange of the central battery type, a subscriber's line equipment which is connected to a pair of line wires, said equipment comprising an amplifier, a path for supplying both speech signals and calling signals to the amplifier, a path for supplying the output from the amplifier to the line wires and means to reduce the gain of the amplifier in dependence upon current flowing from the exchange battery through the line wires.

2. In an automatic telephone exchange of the central battery type, a subscriber's line equipment which is connected to a pair of line wires, said equipment comprising a hybrid coil which is connected to the line wires and which has an input circuit and an output circuit over which signals are supplied to and from the line wires respectively, an amplifier for supplying both speech signals and calling signals to the input circuit of the hybrid coil, and means to reduce the gain of the amplifier in dependence upon a direct current path being established between the line wires.

3. A subscriber's line equipment according to claim 2 wherein the said amplifier is a magnetic amplifier.

4. A subscriber's line equipment for an automatic telephone exchange, said equipment comprising a pair of output terminals for connection to a pair of line wires, means to develop a unidirectional voltage across the said terminals, a hybrid coil which is connected to the said terminals and has input and output circuits over which signals are supplied to and from the line wires respectively, an amplifier connected in the said input circuit, and means to reduce the gain of said amplifier in response to the flow across said terminals.

5. A subscriber's line equipment according to claim 4 wherein the said amplifier is a magnetic amplifier.

6. A subscriber's line equipment according to claim 5 wherein the transductor of the magnetic amplifier is provided with a feed-back winding connected to carry at least part of the output current of the magnetic amplifier so as to provide positive feed-back across the amplifier and further winding which is arranged to carry current upon direct current flowing as aforesaid.

References Cited in the file of this patent

UNITED STATES PATENTS

| | | |
|---|---|---|
| 2,511,948 | Wang | June 20, 1950 |
| 2,619,548 | Lesti | Nov. 25, 1952 |